March 7, 1950     L. H. FLORA     2,499,637
SHEET METAL CLIP FOR MOLDINGS AND THE LIKE
Filed Nov. 8, 1948
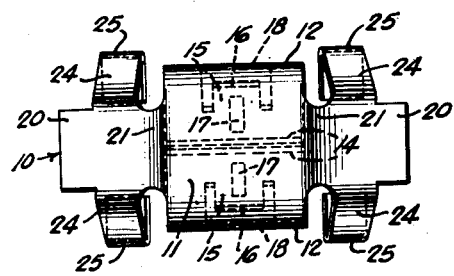
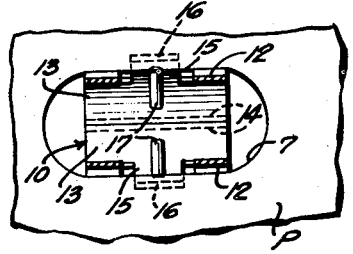
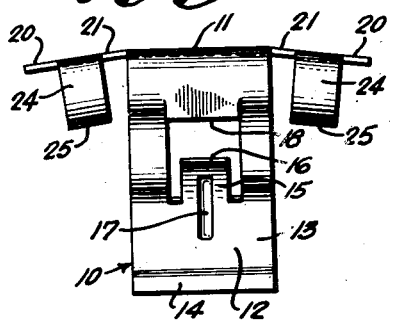
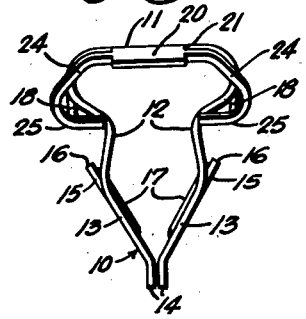
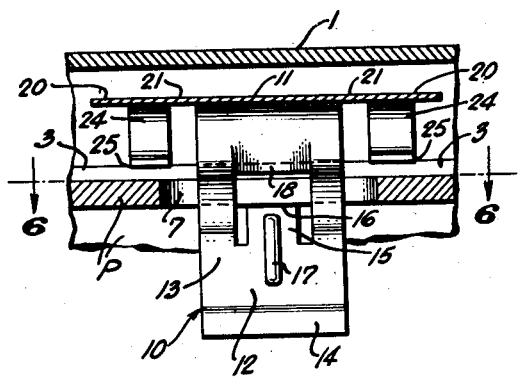
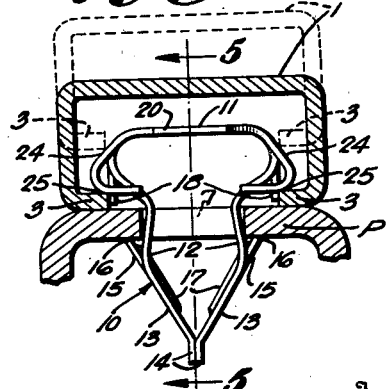
Inventor
LAURENCE H. FLORA
By H. G. Lombard
ATTORNEY Patented Mar. 7, 1950

2,499,637

UNITED STATES PATENT OFFICE 2,499,637

SHEET METAL CLIP FOR MOLDINGS AND THE LIKE

Laurence H. Flora, Cleveland, Ohio, assignor to Tinnerman Products, Inc., Cleveland, Ohio, a corporation of Ohio Application November 8, 1948, Serial No. 59,007

5 Claims. (Cl. 24—73)

1

This invention relates in general to installations for moldings, trim strips, and the like, and deals, more particularly, with improvements in the construction of fastening devices or clips which are used to secure the moldings or trim strips onto a supporting surface by a simple operation taking place entirely from the accessible side only of the supporting surface.

A widely used type of molding installation involves the provision of clips or fasteners which are first secured in openings in a supporting part and the molding thereafter mounted by springing the inturned flanges of the molding onto the heads of the fasteners. In the ordinary use of such clips or fasteners which are designed for a specific spacing and thickness of the molding flanges, there are usually several clips in an installation which do not fit exactly and are so loosely attached that they do not secure the molding with complete effectiveness in the manner intended. Also, clip fasteners of the general character in which the head of the fastener is formed from the free ends of a piece of metal and the shank from an intermediate portion thereof are often subject to loosening inasmuch as the fastening action of the molding with the head of such a fastener has a tendency to disturb the shank and displace the same from effective fastening position in the opening of the supporting part.

The clip or fastener of this invention comprises an improved construction in which the fastener shank is provided from the free ends of the fastener blank with the head formed from the intermediate portion thereof so that the fastening action of the molding with the head of the fastener does not disturb or displace the fastener shank from its proper, most effective fastening position in an opening in the support. A primary object of the invention, therefore, is to provide an improved clip fastener of this character in which the fastening action of the head of the fastener is practically independent of the securing action of the shank so as to ensure both an effective fastening action of the shank in the panel opening and a strong and durable attachment of the head of the fastener to the molding.

Another object of the invention is to provide such a clip fastener which is adapted to secure the molding effectively despite slight manufacturing variations and irregularities in the spacing between the inturned flanges of the molding or in the thickness of such flanges.

A further object of the invention is to pro-

2 vide a clip or fastener of the kind aforesaid, wherein the fastener comprises cooperating resilient head portions which secure the molding in conjunction with resilient spring elements that yieldably engage the edges of the inturned molding flanges in a manner whereby the clips are adapted to seat rigidly in varying size spaces between such inturned flanges and thereby compensate for manufacturing variations and irregularities in the molding flanges to insure a firm and rigid connection of the clips to the molding at all points in the mounting thereof.

Further objects and advantages of the invention and other new and useful features in the construction, arrangement and general combination of parts will be readily apparent as the following description proceeds with reference to the accompanying drawings, for purposes of illustration but not of limitation in which like reference characters designate like parts throughout, and in which:

Fig. 1 is a top plan view of the improved molding fastener showing the formation of the various elements comprising the body and head of the fastener;

Fig. 2 is a side elevational view of the fastener;

Fig. 3 is an end or edge elevational view of the fastener;

Fig. 4 is a sectional view of an installation showing the fastener in edge elevation as applied to mount a hollow molding onto a supporting part;

Fig. 5 is a sectional view of Fig. 4 taken along line 5—5, looking in the direction of the arrows; and, Fig. 6 is a sectional view of Fig. 5 taken along the line 6—6, looking in the direction of the arrows, and showing the securing action of the fastener shank in applied position in an opening in the supporting part.

Referring now, more particularly, to the drawings, there is shown in Fig. 4, by way of illustration, a hollow molding 1, or similar strip provided with inturned flanges 3 with which the clip fasteners, designated generally 10, are connected for securing the molding onto an apertured supporting part such as a panel or plate P. The molding or trim strip 1 is made of any suitable material such as extruded plastic composition, reamed wood strips or sheet metal strips in the general form of a channel shape provided with such inturned flanges 3. Frequently the space between the edges of the inturned flanges 3 and the thickness of such flanges is not uniform throughout the lengths of the flanges due to variations and irregularities in the manufacture thereof. The clips or fasteners of this invention are so constructed as to compensate for any such manufacturing variations and irregularities in order to provide for an effective attachment of the molding thereto in a firm and rigid connection regardless of such manufacturing variations and irregularities. This assures a completely tight and rigid mounting of the molding on the panel P throughout its length and eliminates any possibility of loosening or displacement of the molding from mounted position under the most severe conditions of service and usage.

Preparatory to mounting the molding, the supporting plate or panel P is provided with suitably spaced fastener receiving openings 7 along the path which the molding extends in mounted position. In many applications, the supporting structure is accessible from the outer side only and accordingly, it is preferable to provide a molding installation in which the clips or fasteners are first attached in the openings 7 in the supporting part and the molding thereafter connected to the fasteners by springing the inturned flanges 3 thereof onto the resilient heads of the fasteners by simple axial force and, if necessary, by light hammer blows applied to the outer exposed surface of the molding by a lightweight rubber mallet, for example.

The clip or fastener 10 is provided as a simple one-piece sheet metal device which is readily constructed from an inexpensive stamping of any suitable sheet metal such as spring steel, cold rolled metal, or the like. Preferably the fastener blank is provided by a simple stamping obtained from standard sheet metal strip stock and worked by suitable bending and forming operations to provide the specific structure of the clip. The fastener blank is so provided as to define a central body or base 11 between a pair of laterally projecting resilient head portions 20. The central body or base 11 carries a pair of relatively wide integral strip portions 12 on either side thereof which are bent to provide the legs of a generally V-shaped shank. The arrangement preferably is such that the shank legs 12 extend inwardly toward each other from adjacent the central body or base 11 to a spacing slightly larger than the width of the panel opening 7, and then converge gradually inwardly in generally V-shaped relation to define diverging guide surfaces 13 inclined outwardly from the point of the fastener. The free ends of the shank legs 12 preferably terminate in flat end portions 14 in abutting relation which stiffen the shank legs to add to the strength and holding ability of the shank in its fastening action. These abutting end portions 14 are also advantageous in that they define a pilot at the leading end of the fastener which facilitates the initial application thereof to the panel opening 7 and otherwise provide the shank in a closed loop which prevents objectionable tangling of the fasteners.

The shank legs 12 are provided with intermediate cut-out areas comprising an upper recessed portion communicating with lower spaced slots in the diverging guide surfaces 13 of the shank legs. The spaced slots, accordingly, form resilient tongues 15 lying more or less in the plane of said guide surfaces 13 but having their extremities projecting outwardly out of the plane of the shank legs to define pronounced shoulders 16 which are adapted to snap past the edges of the panel opening 7 and engage the adjacent portions of the panel or plate P at the underside thereof. Preferably the tongues 15 are provided with longitudinal corrugations 17 to strengthen and rigidify the same in such fastening action. The shank legs 12 otherwise include spaced slits in their upper portions adjacent the cutout areas therein defining spring tabs or fingers 18 which serve as yieldable abutments for engaging the edges of the inturned flanges 3 of the molding to be applied, as presently to be described. The spring tabs or fingers 18 thus extend directly from the base or body 11 of the fastener and project outwardly from the adjacent inwardly extending portions of the shank legs 12. Consequently the fastening action of the shank legs 12 in the panel opening 7 is practically independent of the tabs or spring fingers 18 such that the shank in applied position is not affected or disturbed by the subsequent engagement of the molding flanges with said spring fingers 18.

The head of the fastener is defined by laterally projecting head portions 20 joined to the opposite ends of the central body 11 by web portions 21. Each head portion 20 includes a pair of oppositely extending spring arms 24 which are return bent toward the underside of the head portion to provide rounded resilient cam elements 25 adapted for snap fastening engagement with the inturned flanges 3 of the molding. Preferably the head portions 20 are bent to extend slightly downwardly in normal untensioned relation, as seen in Fig. 2, to increase the spring force of the cam elements 25 in engagement with the molding flanges 3 and otherwise effect an axial pull on the shank legs 12 to draw the shoulders 16 thereon into tight, rigid and positive engagement with the panel portions adjacent the panel opening 7.

From the foregoing, it will be understood that in the procedure for mounting the molding on the panel P, as many clips or fasteners 10 as are necessary are inserted in the openings 7 prepared in the panel P along the path the molding extends in mounted position. The shank legs 12 of a clip, at the point of fastening engagement with the panel, have a spacing slightly greater than the space between the opposing walls of the panel opening and accordingly, the shank legs must be compressed toward each other and thereby tensioned in fastening position in the panel opening. When a clip is pushed axially into a panel opening 7, the diverging guide surfaces 13 engage the marginal portions of the opening to cause a gradual contraction of the shank legs as necessary for the shank legs and tongues 15 thereon to pass through the panel opening to the point at which said tongues 15 clear the opening and the shoulders 16 on the extremities of the tongues are free to spring outwardly into overlapping abutting relation to the marginal portions of said opening at the underside of the panel P. In this relation, the ends of the spring fingers or tabs 18 engage the upper panel surface in a manner to space the cam elements 25 from the support a distance slightly less than the thickness of the molding fingers 3. This permits the molding flanges to snap onto the cam elements and slide easily into underlapped locked relation to said cam elements as shown in Fig. 4.

In mounting the molding 1 to the fasteners thus attached to the panel P, the molding is positioned as shown in dotted lines in Fig. 4 with the inturned flanges 3 in engagement with the upper surfaces of the rounded cam elements 25. When downward pressure is exerted on the top of the molding, the edges of the molding flanges 3 ride on the upper surfaces of said cam elements to force the same inwardly toward each other as necessary for said molding flanges 3 to snap over said cam elements into underlapped locked relation therewith as shown in full lines in Fig. 4. This operation is in the nature of a snap fastening action which takes place as a result of the inherent resiliency of the rounded cam elements 25 and the resiliency of the inturned flanges 3 of the molding.

The surfaces of the molding flanges 3 in applied position wedge the cam elements 25 outwardly from the panel P and thereby exert a reverse axial drawing action on the shank legs 12 to urge the shoulders 16 on the extremities of the tongues 15 into tight, positive, locking engagement with the panel portions adjacent the panel opening 7, as aforesaid. At the same time, the edges of the molding flanges 3, seat in engagement with the downwardly projecting extremities of the spring fingers or tabs 18 to prevent any lateral movement of the molding relative to the fastener which might possibly result in disengagement of a molding flange from the cam elements 25. Inasmuch as the interior of the hollow molding is much larger than the heads of the fasteners, the molding otherwise would be free to move laterally relative to the fasteners to a position in which one of the flanges would disengage from the adjacent cam elements 25. The spring fingers or tabs 18 prevent any such lateral movement of the molding, as aforesaid, and thereby lock the molding against lateral displacement while the cam elements 25 lock the same against movement outwardly from mounted position on the panel P.

Inasmuch as the spring fingers 18 and cam elements 25 are inherently resilient, it will be appreciated that they are adapted to engage the molding flanges 3 effectively in the manner described despite slight manufacturing variations in the spacing between the edge of the flanges or in the thickness of said flanges, thereby insuring a firm and rigid connection of the molding to each clip at all points in the mounting of the molding.

It will also be appreciated that in the clip or fastener of this invention, the fastening action of the shank in the panel opening is effected by the pronounced shoulders 16 defined by the extremities of the tongues 15 on the shank legs and that this fastening action is practically independent of the fastening action of the cam elements 25 and spring tabs or fingers 18 which secure the molding to the panel P or other support. Therefore, the fastening action of the shank in applied position in a panel opening is not disturbed during the subsequent application of the molding to the cam elements 25 and spring tabs or fingers 18 such that in the completed attachment of the molding to a fastener, there is no tendency for the shank legs 12 to be compressed and thereby loosened from most effective fastening position in the panel opening. In this regard, the abutting end portions 14 on the extremities of the shank legs serve not only to stiffen the shank legs but also to place the same under constant outward spring tension which maintains the shoulders 16 in overlapping anchored relation to the marginal portions of the panel opening 7 at all times, substantially as shown in Fig. 4. At the same time, the tensioned engagement of the cam elements 25 with the molding flanges 3 provides a constant axial drawing action on the shank legs to cause the shoulders 16 to engage the underside of the panel tightly and rigidly in such anchored relation in the panel opening. Thus, there is obtained a tight, rigid and positive locking of a fastener shank in the panel opening 7 along with a tight and rigid connection of the molding to the cam elements 25 and spring fingers 18 in a manner whereby it is practically certain that each fastener of the assembly will secure the molding with complete effectiveness so that a strong, durable and reliable installation of the molding at all points in the mounting thereof is ensured.

The clip or fastener in any form preferably is constructed of relatively thin sheet metal, the thickness of which is selected according to service requirements and the predetermined size of the parts secured. The fasteners are most effective when provided of spring metal suitably spring tempered and otherwise treated to give the desired toughness and hardness, particularly in the case of devices which are used in installations where extreme vibratory motion takes place. A cheap and highly practical clip or fastener may be provided from cold rolled metal, such as cold rolled steel, which is untempered but of a spring metal nature and capable of providing an effective and reliable fastening means.

While the invention has been described in detail with a specific example, such example is intended as an illustration only inasmuch as various changes in the construction and arrangement of the clips or fasteners within the broad scope of the instant disclosure are fully contemplated.

What is claimed is:

1. A fastener comprising a piece of sheet metal providing a base, a portion attached to said base comprising a head and a pair of spring arms, a pair of legs having free ends and extending from opposite sides of said base in the same general direction to provide a shank, said shank legs being provided with cutout areas forming tongues on said shank legs and spring fingers depending from said base, said tongues providing shoulders projecting outwardly out of the planes of said shank legs and receivable in an opening in a support for engaging the support adjacent said opening, and said spring fingers being adapted to cooperate with said spring arms in engaging an object to be secured.

2. A fastener comprising a piece of sheet metal providing a base, a portion attached to said base at each end and each portion comprising a head and a pair of spring arms, a pair of legs having free ends and extending from opposite sides of said base in the same general direction to provide a shank with the free ends of said legs in abuttable relation to add stiffness thereto, said shank legs being provided with cutout areas forming tongues on said shank legs and spring fingers depending from said base, said tongues providing shoulders projecting outwardly out of the planes of said shank legs and receivable in an opening in a support for engaging the support adjacent said opening, and said spring fingers being adapted to cooperate with said spring arms in engaging an object to be secured.

3. A fastener comprising a piece of sheet metal providing a base, a pair of portions attached to the opposite ends of said base each comprising a head and a pair of arms extending from the opposite sides of said head and bent to provide cam elements, a pair of legs having free ends and extending from the opposite sides of said base in the same general direction to provide a shank, said shank legs being provided with cutout areas forming tongues on said shank legs and spring fingers depending from opposite sides of said base, said tongues providing shoulders projecting outwardly out of the planes of said shank legs and receivable in an opening in a support for engaging the support adjacent said opening, and said spring fingers being adapted to cooperate with said cam elements in engaging an object to be secured.

4. A fastener comprising a piece of sheet metal providing a base, a pair of portions attached to the opposite ends of said base each comprising a head and a pair of arms extending from the opposite sides of said head and bent to provide cam elements, a pair of legs having free ends and extending from the opposite sides of said base in the same general direction to provide a substantially V-shaped shank with the free ends of said legs in abuttable relation to add stiffness thereto, said shank legs being provided with cutout areas forming tongues on said shank legs and spring fingers depending from opposite sides of said base, said tongues providing shoulders projecting outwardly out of the planes of said shank legs and receivable in an opening in a support for engaging the support adjacent said opening, and said spring fingers being adapted to cooperate with said cam elements in engaging an object to be secured.

5. A fastener for a molding or other object provided with spaced flanges on the underside thereof for mounting the same onto an apertured support, said fastener comprising a piece of sheet metal providing a fastener base, a pair of portions attached to the opposite ends of said base and each comprising a head and a pair of arms extending from the opposite sides of said head defining cam elements adapted to interlock with said spaced flanges on the molding in mounted position, a pair of legs having free ends and extending from the opposite sides of said base in the same general direction to provide a shank with the free ends of said legs in abuttable relation to add stiffness thereto in fastening position in an opening in said support, said shank legs being provided with cutout areas forming tongues on said shank legs and spring fingers depending from opposite sides of said base, said tongues providing shoulders projecting outwardly out of the planes of said shank legs for engaging the support adjacent the opening therein, and said spring fingers being adapted to engage the edges of said molding flanges to prevent relative lateral movement of the molding in mounted position on the support.

LAURENCE H. FLORA.

REFERENCES CITED

The following references are of record in the file of this patent:

UNITED STATES PATENTS

| Number | Name | Date |
|---|---|---|
| 2,133,366 | Van Uum | Oct. 18, 1938 |
| 2,181,966 | Dean | Dec. 5, 1939 |
| 2,188,026 | Wiley | Jan. 23, 1940 |
| 2,201,509 | Van Uum | May 21, 1940 |
| 2,205,363 | Kral | June 18, 1940 |
| 2,315,211 | Kost | Mar. 30, 1943 |